Nov. 24, 1942.  E. O. PETERSON  2,303,089
ELECTRICALLY OPERATED CURRYCOMB
Filed Aug. 29, 1941
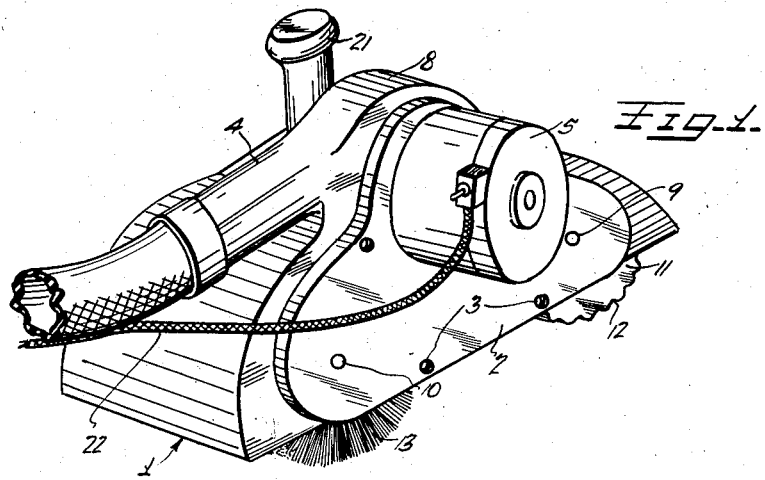
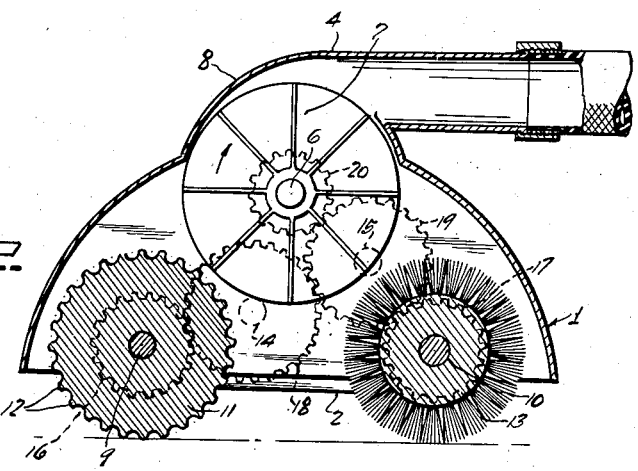
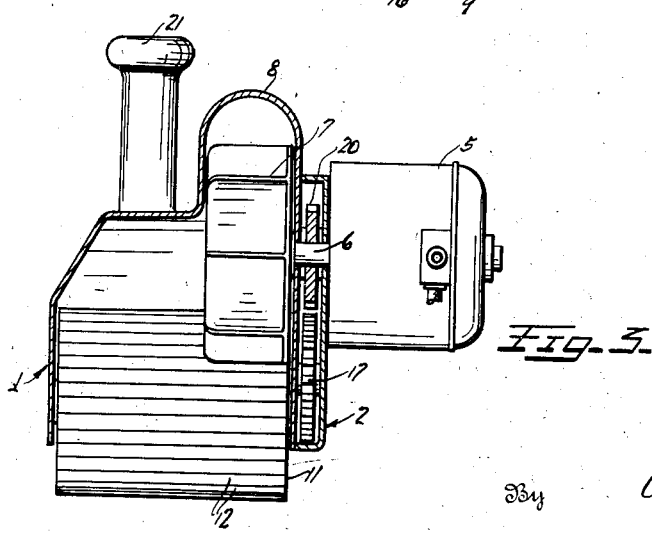
Inventor
ELMER O. PETERSON
By Adam E. Fisher
Attorney Patented Nov. 24, 1942

2,303,089

UNITED STATES PATENT OFFICE 2,303,089

ELECTRICALLY OPERATED CURRYCOMB

Elmer O. Peterson, Kirkland, Ill.

Application August 29, 1941, Serial No. 408,743

1 Claim. (Cl. 119—84)

This invention relates to electrically operated currycombs, and the main object of the invention is to provide an electrically operated currycomb, so arranged that all dust and dirt are collected into a dust receptacle, thus avoiding the unsanitary conditions attendant upon the use of ordinary currycombs, where the dust is discharged promiscuously into the surrounding atmosphere.

With the stated object in view, together with such additional objects and advantages as may be developed in the specification, attention is directed to the accompanying drawing, wherein:

Figure 1 is a perspective view of a currycomb constructed in accordance with this invention.

Figure 2 is a longitudinal vertical section.

Figure 3 is a transverse vertical section.

The invention comprises a housing 1, open at its under side, having a gear housing 2, anchored thereto by bolts or rivets 3, and having an air and dust conduit 4 connected to and opening into the top thereof, as clearly shown in Figure 2.

A small electric motor 5 is rigidly mounted on the housing 2 and has its extended shaft 6 journaled transversely through the housing 2. A suction fan 7 is fixedly mounted on the shaft 6, at the inner mouth of the conduit 4, and is covered by an offset fan housing 8 extended from the housing 1.

Shafts 9 and 10 are journaled transversely and in spaced relation through the housing 1, within the ends thereof. Upon the forward shaft 9 is rigidly mounted a cylindrical agitator 11 having a corrugated periphery 12. Upon the rear shaft 10 is rigidly mounted a cylindrical dust brush 13.

Gear shafts 14 and 15 are journaled transversely in spaced relation in the assembly, inwardly of the shafts 9 and 10, and intermeshing gears 16, 17, 18, 19 are fixedly mounted on the outer ends of the shafts 9, 10, 14, 15. A drive pinion 20 is fixedly anchored on the motor shaft 6, in mesh with the gear 19 of the shaft 14, all of said gears being located within the housing 2.

A dust receptacle (not shown) is connected at the outer end of the conduit or pipe 4. A handle 21 is mounted on the upper side of the housing 1.

The motor 5 is conventionally connected through a lead 22 to any suitable source of electrical energy.

Mounted as described, the agitator 11 and brush 13 protrude at the under and open side of the housing 1, ready for contacting the animal upon which the currycomb is to be employed.

It will be noted that constructed and assembled as aforesaid, the agitator 11 and the brush 13, will when the motor 5 is energized, rotate in opposite directions and so that their impulses to travel or move over the surface of the animal operated on, will cancel and neutralize each other, thus confining the energy of the device entirely to the function and purpose of cleaning the dust from the hide of the animal.

In use, the device is electrically energized and moved slowly over the hide of the animal, whereat the agitator 11 and brush 13 cooperate to stir up and loosen the dirt and dust from the hide of the animal, and the suction fan 7 acts to draw and blow the dust and dirt through the conduit 4 into the receptacle provided therefor.

It is thought the construction, use and operation of the device will be fully understood from the foregoing description, and while I have herein shown and described a certain embodiment of the invention and certain specific structural features thereof, it is understood that minor changes and alterations may be made, within the scope of the claim.

I claim:

In a device of the kind described, a brush housing oblong on a horizontal section and open at its under side, an offset fan housing atop the brush housing, an air and dust conduit connected to and leading from the fan housing, a flattened gear housing anchored to one side of the brush housing and having a portion extended upwardly in lateral alignment with the fan housing, a small electric motor anchored outwardly upon said upwardly extended portion of the gear housing, the extended shaft thereof being journaled transversely through the gear housing, a suction fan anchored upon the shaft within the fan housing, agitator and brush shafts journaled transversely in the ends of the gear and brush housings adjacent the open lower side, a cylindrical agitator and a cylindrical dust brush on the said shafts, gear shafts journaled transversely in spaced relation and located inwardly of the agitator and brush shafts, intermeshing gears on the ends of the said four shafts within the gear housing, and a drive pinion on the motor shaft within the gear housing and in mesh with one of the inwardly located gears of the gear shafts, whereby the motor may rotate the agitator and brush cylinders reversely to one another.

ELMER O. PETERSON.